United States Patent [19]

Leedy et al.

[11] Patent Number: 5,062,954

[45] Date of Patent: Nov. 5, 1991

[54] CELLULOSE ABSORBENT PRODUCT AND METHOD OF MANUFACTURE

[75] Inventors: K. Duane Leedy, Perrysburg; Norman A. Peiffer, Maumee, both of Ohio

[73] Assignee: The Andersons, Maumee, Ohio

[21] Appl. No.: 684,989

[22] Filed: Apr. 15, 1991

[51] Int. Cl.$^5$ ............................................. C02F 1/28
[52] U.S. Cl. ................................. 210/502.1; 210/924; 241/24
[58] Field of Search .................. 210/502.1, 503, 924; 241/24; 119/171

[56] References Cited

U.S. PATENT DOCUMENTS 3,464,920  9/1969  Pirson et al. ................. 210/924 X
4,053,112 10/1977  Hooven et al. ..................... 241/24
4,157,696  6/1979  Carlberg ......................... 119/171 X

*Primary Examiner*—Frank Spear
*Attorney, Agent, or Firm*—Gifford, Groh, Sprinkle, Patmore and Anderson

[57] ABSTRACT

An absorbent cellulose product and method of making the product. Preferably chaff and pith corncob components form the cellulose starting material which is reduced, moisture added, compressed or pelletized, sheared by passage through a roller mill and classified to produce a granular product of compact bodies having a given screen size range. This range is preferably between a number 10 and a number 60 screen size. The product has good oil absorbtion properties and the size range allows the oil saturated bodies to be used in a nozzle firing system, for example to heat a cement kiln.

16 Claims, No Drawings

CELLULOSE ABSORBENT PRODUCT AND METHOD OF MANUFACTURE

BACKGROUND OF THE INVENTION

1. Field of the Invention

This invention relates to an absorbent product, and, more particularly, this invention relates to a cellulose absorbent material which has been processed to provide a granular product of compacts which have an irregular surface, a controlled density/surface area for good oil absorption and a size compatible for loose distribution in an area of use and for firing the oil absorbed compacts through burner nozzles in a kiln burner system.

2. Description of the Prior Art

It is well know that cellulose fibers are good absorbents for soluble oils, water and water based fluids and even heavy oils.

While clay products have enjoyed wide spread use as absorbents, the realization that cellulose offers far greater absorbtion has received attention. With ever increasing need to clean up oil spills and dispose of hazardous waste this attention has been accelerated. Of particular note is the fact that a cellulose product can be incinerated adding a BTU value to the sorbed product which enhances energy recovery or makes possible the incineration itself without application of external heat or fuel.

Readily available plant celluloses such as wood and rice hulls reduced to a powder can be processed into absorbent products under the teachings of the present invention. A preferred embodiment of the invention employs corncob components.

Approximately 60% of the corncob's weight is made up of hard woody ring. This portion is not a good absorber of oil or even water soluble substances. The pith and chaff portion of the corncob are the lighter components that make up the balance of the corncob weight. In their loose form, after having been reduced, for example, by grinding rolls and a hammer mill, these lighter ends can absorb in excess of 350% of their weight in some oils and water and water based liquids. The process and equipment for recovering the lighter chaff and pith corncob components from the heavier woody ring component is set forth in U.S. Pat. No. 4,053,112 which has its primary teaching the recovery of the woody ring component.

Such a loose, lighter corncob product of chaff and pith which has been separated from the hard woody ring is produced by The Andersons in Maumee, Ohio and is marketed under the trademark SLIKWIK ®. This product is most often used for absorbing organic wastes. The product and its use for removing oil or oily substances from the surface of upper layer of a body of water is set forth in U.S. Pat. No. 3,617,564. The SLIKWIK ® product is extremely lightweight having a density between 5 and 20 lb/ft$^3$ and usually between 5 and 10 lb/ft$^3$ when most of the chaff is recovered, making its use in wind conditions difficult. To overcome this disadvantage, the product is put into 3" diameter by 48" long socks for absorbtion of wastes, for example, adjacent to machine tools to absorb cutting fluids.

SUMMARY OF THE INVENTION

The primary purpose of the development leading to the present invention was to generate a new product which has a larger partical size and greater density than loose powdered wood, corncob, or other cellulose material so that it can be used in loose form to absorb spills of oil, flamable fluids and other waste liquids without producing dust or a wind dispersion problem. The new product has to have a smaller compact body size than the usual briquette or compacts of cereal, corncob and other materials used as pet and animal food products. Also the density has to be less than the compacted product in order to efficiently perform its primary function of absorption. Another requirement for maximum particle size is that it must be easily fluidized through a ¼" to ⅜" nozzle for burning in an oil saturated condition in the firing systems of such equipment as cement kilns.

The process or method for producing this new absorbent product includes the following steps:

A) Reducing a naturally occurring cellulose material to an intermediate pulverulent product.

B) Adding moisture to the intermediate pulverulent product.

C) Compressing the intermediate pulverulent product to produce an intermediate product of compressed bodies having a nominal diameter of at least 3/16".

D) Shearing the intermediate product of compressed bodies to produce compact bodies of a smaller size than the compressed bodies.

E) Classifying the compact bodies to produce a granular product of the bodies having a given screen size range. Preferably this range is such that the product passes through a number 10 screen and is retained on a number 60 screen.

Normally enough moisture is added to the intermediate pulverulent product in step B) to raise the total moisture content to between 12 and 20%.

Preferably the shearing of step D) is accomplished by passing the intermediate product of compressed bodies through a roller mill. This roller mill will include a pair of break rolls having 8 to 12 longitudinally extending cutting edges per inch of roll circumference. The rolls are rotated at a differential speed of 2 to 1.

In a preferred embodiment, the naturally occurring cellulose material in step A) consists essentially of corncob components, and, more particularly, the corncob components are the lighter portions of the cob consisting essentially of the chaff and pith with a minor amount of the heavier portioof the cob which consists essentially of woody ring.

With the lighter corncob components, the density of the intermediate pulverulent product produced in step A) is 5-10 lb/ft$^3$. The density of the intermediate product of compressed bodies produced in step C) is 22-38 lb/ft$^3$, and the density of the granular product produced in step E) is 18-30 lbs/ft$^3$.

The absorbent cellulose granular product of the invention is in the form of compact bodies having an irregular surface and a size which passes through a number 10 screen but is retained on a number 60 screen. This product is produced by the process outlined above. A preferred product is a granular absorbent product which consists essentially of lighter corncob components of chaff and pith with no more than 5% woody ring content which are sheared from extruded pellets into compacts having an irregular surface and being classified by passage through a number 10 screen and being retained on a number 60 screen.

DETAILED DESCRIPTION OF THE PRESENTLY PREFERRED EMBODIMENT

In the preferred embodiment of this invention, corn is first shelled or stripped off the cob so that the cob forms the starting cellulose material. Stored corncobs can also be used as the starting material. The cobs are reduced or comminuted by grinding rolls and a hammer mill. The lighter chaff material is separated by air classification; the heavier hard woody ring is removed by air and screening. U.S. Pat. No. 4,053,112 sets forth the apparatus and method for separating the lighter chaff and pith from the woody ring corncob components. These lighter components are removed by the aspirating means between the revolving crusher, hammer mill and attrition mills discussed in the patent.

The light pith is largely a fine powder which passes through a 30 mesh screen. The chaff has long strands which would be retained on a 8 or larger screen. The chaff, which includes the fine chaff or beeswing and coarse chaff, and the pith form the pulverulanet material which is compressed. Some hard woody ring material remains so that the composition of the pulverulent material and the final granular material is in the range of 91–96% chaff, 4% pith and 3–5% woody ring. The chaff components have a 90–93% coarse chaff content and 5–10% beeswing content.

The pulverulent material is compressed under high pressure. Preferably this is accomplished in a pellet mill of the ring extruder type in which the material is forced through dies having 3/16"–5/16" openings. With die openings of ¼", pellets having a nominal ¼" diameter will be produced at random lengths usually falling between ¼ and ½" in length, or the pellets can be sheared to a uniform length.

A model 26–250 pellet mill manufactured by Sprout, Waldron & Company, Inc. of Muncy, Pa. is ideal for producing the compressed or pelletized intermediate product. Steam is normally added to the feeder-conditioner portion of the pellet mill upstream from the dies in order to provide die lubrication and some degree of pellet integrity. In the process of this invention, moisture usually in the form of water is added in this feeder-conditioner to bring the total moisture content of the pulverulent product up to between 12 and 20% water. Steam may or may not form a portion of this water addition. This exceeds the amount of moisture necessary for die lubricity and product integrity, but serves to decrease the density of the resulting pellet which in turn increases the surface area of the final product and the absorbtion rate. A preferred moisture value would be approximately 15%. Normally the pulverulent material being fed to the feeder-conditioner of the pellet mill will have a water content 7 to 8% at the most. The density of the reduced pulverulent corncob material entering the pellet mill will be 5–10 lb/ft³. The density of the pelletized or compressed bodies exiting from the pellet mill will be of the order of 22–38 lb/ft³ the absorbtion rate for a 10W30 motor oil of these pellets would only be of the order of 22–30% by weight.

The intermediate pellet product is sheared to its nominal product size by passing through a roller mill. The roller mill includes a pair of break rolls having longitudinally extending cutting edges. For the final product size in the range between the number 10 and number 60 screen, the rolls would both have an equal number of cutting edges, between 8 to 12 cutting edges per inch of roll circumference. The longitudinally extending cutting edges are at an angle with the longitudinal axis of each roll of one inch per foot of length.

A pair of three foot long by nine inch diameter rolls are used with ten cutting edges per inch of circumference. In one embodiment, the material remaining on the number 10 screen in the classification step is recycled through rolls having 12 cutting edges per inch of circumference.

In the classification step, the compact bodies from the shearing step or roller mill are screened through a number 10 screen and retained on a number 60 screen. The screen sizes are U.S. standard screen sizes having an opening of 0.0787" for the number 10 screen and 0.0098" for the number 60 screen.

With the proper control of the pelleting process and addition of water upstream of the pellet mill and the use of the roller mill set forth above, a good mix of compact body sizes are retained through the handling of the product from its classification stage through packaging for shipment. For example, typical batch of product that has been classified between a number 10 and number 60 screen will have 20% remaining on a number 14 screen, 30% remaining on a number 20 screen, 28% remaining on a number 40 screen, 10% remaining on a number 60 screen and less than 1% remaining on a number 80 screen. The oil absortion for a 10W30 motor oil for this 10–60 pulverulent product typically ranges between 90 and 120%. Typically the oil absorption would be 110% plus.

The embodiments of the invention in which an exclusive property or privilege is claimed are defined as follows:

1. A process for producing an absorbent product comprising the following steps:
   A) reducing a naturally occurring cellulose material to an intermediate pulverulent product;
   B) adding moisture to said intermediate pulverulent product from step A);
   C) compressing the intermediate pulverulent product from step B) to produce an intermediate product of compressed bodies having a nominal diameter of at least 3/16";
   D) shearing said intermediate product of compressed bodies to produce compact bodies of smaller size than said compressed bodies;
   E) classifying said compact bodies from step D) to produce a granular product of said bodies having a given screen size range.

2. The process according to claim 1 wherein in step C) the intermediate pulverulent product is pelletized by passage through a die to produce an intermediate pellet product having a nominal diameter of at least 3/16".

3. The process according to claim 2 wherein in step B) the moisture added to said intermediate pulverulent product raises the moisture content thereof to between 12 and 20% water.

4. The process according to claim 1 wherein in step E) the compact bodies are classified by passage through a number 10 screen and being retained on a number 60 screen.

5. The process according to claim 1 wherein the shearing in step D) is accomplished by passing said intermediate product of compressed bodies through a roller mill.

6. The process according to claim 5 wherein said intermediate product of compressed bodies is passed between a pair of break rolls having 8 to 12 longitudinally extending cutting edges per inch of roll circumference.

7. The process according to claim 6 wherein said break rolls are 9" in diameter having 10-12 cutting edges per inch of roll circumference, and said rolls are rotated at a differential speed of approximately 200 RPM and 400 RPM.

8. The process according to claim 1 wherein the naturally occurring cellulose material in step A) consists essentially of corncob components.

9. The process according to claim 8 wherein the corncob components in step A) are the lighter portions of the cob consisting essentially of the chaff and pith with a minor amount of the heavier portion of the cob which consists essentially of the woody ring.

10. The process according to claim 9 wherein the corncob components in step A) consist essentially of 91-96% chaff, 1-4% pith and 3-5% woody ring.

11. The process according to claim 10 wherein said chaff components consist essentially of 5-10% beeswing and 90-95% coarse chaff.

12. The process according to claim 9 wherein the density of the intermediate pulverulent product produced in step A) is 5-10 lb/ft$^3$, the density of the intermediate product of compressed bodies produced in step C) is 22-38 lb/ft$^3$ and the density of the granular product produced in step E) is 18-30 lb/ft$^3$.

13. A process for producing an absorbent product comprising the following steps:
A) reducing and separating the lighter components of corncobs consisting essentially of chaff and pith with a minor amount of the heavier portion of the corncob consisting essentially of woody ring to an intermediate pulverulent product;
B) adding moisture to said intermediate pulverulent product;
C) pelletizing the intermediate pulverulent product from step B) by passage through a die to produce an intermediate pellet product having a nominal diameter of at least 3/16";
D) passing said intermediate pellet product through a roller mill to produce compact bodies of smaller size than said pellet product; and
E) classifying said compact bodies from step D) to produce a granular product of said bodies having a given screen size range.

14. The process according to claim 13 wherein in step E) the compact bodies are classified by passage through a number 10 screen and being retained on a number 60 screen.

15. An absorbent cellulose granular product comprising compact bodies having an irregular surface and size which passes through a number 10 screen but is retained on a number 60 screen produced by the process of claim 1.

16. An absorbent corncob component granular product comprising compact bodies having an irregular surface and size which passes through a number 10 screen but is retained on a number 60 screen produced by the process of claim 15.

* * * * *